United States Patent
Enriquez

(10) Patent No.: US 6,862,352 B1
(45) Date of Patent: Mar. 1, 2005

(54) CONTROLLED SWITCHING MECHANISM FOR ACCOMPLISHING SOFT POLARITY REVERSAL, RING-TRIP FILTERING, AND LINE VOLTAGE MEASUREMENTS IN A SUBSCRIBER LINE INTERFACE CIRCUIT USING COMMON CAPACITOR

(75) Inventor: Leonel Ernesto Enriquez, Melbourne Beach, FL (US)

(73) Assignee: Intersil Corporation, Palm Bay, FL (US)

( * ) Notice: Subject to any disclaimer, the term of this patent is extended or adjusted under 35 U.S.C. 154(b) by 607 days.

(21) Appl. No.: 09/686,247

(22) Filed: Oct. 11, 2000

(51) Int. Cl.$^7$ .............................. H04M 3/22; H04M 1/00
(52) U.S. Cl. ............................... 379/399.01; 379/27.01; 379/27.06; 379/413.04
(58) Field of Search ................................ 379/377, 382, 379/399.01, 401, 413, 27.01, 27.06, 29.01, 322, 323, 324, 325

(56) References Cited

U.S. PATENT DOCUMENTS

| | | | | |
|---|---|---|---|---|
| 4,431,874 A | * | 2/1984 | Zobel et al. ................. 379/405 |
| 5,706,343 A | * | 1/1998 | Saviotti .................. 379/399.01 |
| 5,784,476 A | * | 7/1998 | Bird ............................ 381/107 |
| 5,815,505 A | * | 9/1998 | Mills .......................... 370/522 |
| 5,881,129 A | * | 3/1999 | Chen et al. ............... 379/26.02 |
| 6,137,189 A | * | 10/2000 | Youngblood ................. 307/30 |
| 6,148,076 A | * | 11/2000 | Eriksson et al. ....... 379/387.01 |
| 6,219,417 B1 | * | 4/2001 | Zhou .......................... 379/377 |
| 6,542,605 B1 | * | 4/2003 | Israelsson et al. .......... 379/413 |
| 6,566,957 B1 | * | 5/2003 | Caine .......................... 330/296 |
| 6,574,333 B1 | * | 6/2003 | Manchester et al. ........ 379/377 |
| 6,665,398 B1 | * | 12/2003 | Ludeman ............... 379/399.01 |

* cited by examiner

*Primary Examiner*—Curtis Kuntz
*Assistant Examiner*—Pham Tuan
(74) *Attorney, Agent, or Firm*—Allen, Dyer, Doppelt, Milbrath & Gilchrist, P.A.

(57) ABSTRACT

A controllably switched arrangement selectively couples multiple circuit functions, such as reverse polarity detection, ring-trip and line voltage measurement, of a telecommunication card to the same external programming component (e.g., capacitor) on an as needed basis, by means of associated coupling circuits and a controlled switching circuit. The coupling circuits are controllably enabled/disabled in association with the particular circuit function required, while the controlled switching circuit selectively connects each coupling circuit with the external component. Through combined control of the coupling circuits and the switching circuit, respectively different circuit functions can be implemented with the same external component.

13 Claims, 1 Drawing Sheet

CONTROLLED SWITCHING MECHANISM FOR ACCOMPLISHING SOFT POLARITY REVERSAL, RING-TRIP FILTERING, AND LINE VOLTAGE MEASUREMENTS IN A SUBSCRIBER LINE INTERFACE CIRCUIT USING COMMON CAPACITOR

FIELD OF THE INVENTION

The present invention relates in general to communication systems and components, and is particularly directed to a new and improved controllably switched circuit architecture for use with a subscriber line interface circuit to selectively provide for soft polarity reversal detection, ring-trip filtering, and line voltage measurement by means of a common capacitor.

BACKGROUND OF THE INVENTION

Because wireline parameter and signaling requirements of telecommunication systems vary widely from country to country, manufacturers of various types of system equipments and components, such as multi-function line cards, have attempted to incorporate as many functions as possible, into what may be termed a 'quasi-universal' subscriber line interface circuit (SLIC), and provide the user with the ability to externally program the SLIC, so that it will conform with a given end use functionality.

Programming of such a SLIC to meet the parametric requirements of a particular installation may require the connection of one or more external components, such as resistors and/or capacitors, to respective circuits dedicated to respectively different functions. For this purpose, it has been conventional practice to provide the SLIC with separate pins for connecting each component to an associated circuit node. Not only can this result in a card configuration that has a substantially elevated pin count, but using a separate component for each circuit function connection means that there must be sufficient circuit board real estate to accommodate all the components.

As non-limiting examples, three of the more commonly employed circuit functions that entail the use of externally programmed components are: 1—noiseless or soft polarity reversal of the tip and ring terminals connected to the telephone; 2—preventing false detection (ring trip) when ringing the phone; and 3—the ability to provide a measure or estimate of the length of the wireline pair that connects the line card to the phone. Each of these functions customarily requires the connection of an external capacitor for its respective circuit and, in accordance with standard practice, described above, it has been customary to provide the SLIC with three separate pins and circuit board space for connecting three separate external capacitors with their respective signaling functions.

SUMMARY OF THE INVENTION

In accordance with the present invention, this hardware complexity problem is significantly reduced by recognizing that multiple circuit functions of the card which use the same type of external programming component may either not be necessary or they do not have to occur at the same time. This means that respectively different circuit functions can be implemented using the same external component, by controllably connecting that component with a respectively different signaling circuit as its function is required.

Pursuant to the invention, such selective component-to-function association is accomplished by integrating each of a plurality of different function-associated coupling circuits with a controlled switching circuit. The coupling circuits are controllably enabled/disabled in association with the particular circuit required, while the controlled switching circuit is adapted to selectively connect each coupling circuit with the same externally programmed component. Through combined control of the operation of the coupling circuits and operation of the controlled switching circuit, respectively different circuit functions of the SLIC can be implemented with the same external component.

For purposes of providing a non-limiting example, the invention will be described for the case of selectively connecting a single external capacitor for use with each of a polarity reversal detection circuit, a ring trip detection circuit, and a line parameter measurement circuit. It should be understood, however, that the invention is not limited to use with this circuit component or these particular functions.

In order to provide a capacitor for polarity reversal detection, the controllably switched, external component-coupling circuit of the present invention includes a polarity reversal detector coupling circuit that includes a pair of differentially connected controlled current flow devices, such as a bipolar transistor pair, having their emitter-collector paths coupled between a current source and respective ports of a polarity reversal detection circuit. The control terminal (base) of one transistor is coupled to receive a polarity reversal reference voltage, while the control terminal (base) of the other transistor is coupled to a polarity reversal current source and to a first port of the controlled switching circuit. The differential transistor pair is continuously enabled so as to drive the polarity reversing circuit for any of the three functional states for which the invention may be used, so as to ensure that both tip and ring terminals of the SLIC will be supplied with the required polarity voltage.

Whenever the polarity reversal function is to be employed, a closed circuit path is provided through the controlled switching circuit so as to connect the capacitor with the differentially coupled transistor pair of the polarity reversal coupling circuit. Also, the ring trip detection coupling circuit and the line parameter measurement coupling circuit are controllably disabled. As a result, the application of a (soft) polarity reversal command will have its direction established by the polarity of the polarity reversal current source and sensed by the polarity reversal circuit.

The ring trip detection coupling circuit includes its own differentially connected transistor pair having their emitter-collector current flow paths coupled between a current source, and respective ports of a ring trip detection logic circuit. This current source is further coupled to a controllably switch current by-pass sink. The collectors of these differentially coupled transistors are coupled to respective ports of a ring trip detection logic circuit. The base of one transistor is coupled to receive a ring trip reference voltage, while the base of the other transistor is coupled to a second port of the controlled switching circuit, to which a selectively enabled/disabled polarity reversal current source is coupled.

During ringing mode, the controlled switching circuit is controlled so as to provide a closed circuit path therethrough that places the capacitor in circuit with the ring trip detection coupling circuit. In addition, the line parameter measurement coupling circuit is disabled. In the configuration, although the polarity reversing circuit continues to be driven by its associated differential transistor pair, and thereby ensure that both tip and ring terminals of the SLIC are fed with the required polarity, a path thereto to the capacitor through the controlled switching circuit is interrupted, so that the capacitor is connected exclusively to the ring trip detection coupling circuit to serve as a ring trip filter function.

The line parameter measurement coupling circuit includes a further differentially connected transistor pair, whose emitter-collector paths are coupled between a loop voltage current source and respective ports of a loop voltage output logic circuit. The base of one transistor is coupled to receive a line reference voltage, while the base of the other transistor is coupled to a third port of the switching circuit. This third port is coupled to a selectively enabled/disabled loop voltage current source and to the capacitor.

During loop voltage test mode, the switches of the controlled switching circuit are operated so as to prevent a closed circuit path between either of the polarity reversal detection coupling circuit and the ring trip detection coupling circuit. In addition, the ring trip detection coupling circuit is disabled, while the line parameter measurement coupling circuit is enabled. Again, although the polarity reversing circuit continues to be driven, so that the tip and ring terminals of the SLIC are fed with the required polarity, a path thereto through the switching circuit is interrupted. Consequently, the capacitor is connected exclusively to the line measurement coupling circuit. This allows pulse-width timing required for a given loop length to be established by the value of the loop voltage current source, the value of the reference voltage, and the value of the capacitor.

DETAILED DESCRIPTION

Figure 1:
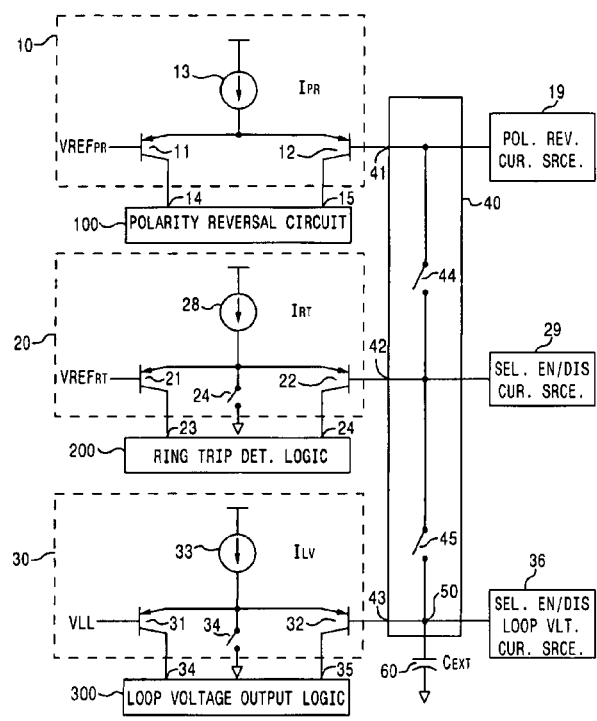
FIG. 1 diagrammatically illustrates an embodiment of a multi-function circuit of the present invention for selectively providing for soft polarity reversal detection, ring-trip filtering, and line voltage measurement using a common capacitor.

Before describing in detail the controllably switched, external component-coupling circuit architecture of the present invention, it should be observed that the invention resides primarily in prescribed modular arrangements of conventional communication circuits and associated signal processing components and attendant supervisory control circuitry therefor, that controls the operations of such circuits and components. In a practical implementation that facilitates their incorporation into existing subscriber line interface circuit cards of telecommunication equipment, these modular arrangements may be readily implemented as a field programmable application specific integrated circuit (ASIC) chip sets.

Consequently, the configuration of such arrangements of circuits and components and the manner in which they are interfaced with other telecommunication equipment have, for the most part, been illustrated in the drawings by readily understandable block diagrams and reduced complexity circuit configurations, which show only those specific details that are pertinent to the present invention, so as not to obscure the disclosure with details which will be readily apparent to those skilled in the art having the benefit of the description herein. Thus, the block diagram and circuit illustrations are primarily intended to show the major components of the invention in a convenient functional grouping, whereby the present invention may be more readily understood.

Attention is now directed to FIG. 1, which shows a reduced complexity schematic illustration of a single component-referenced, multi-function circuit of the present invention for the example of selectively connecting a single external capacitor for use with each of a polarity reversal detection circuit, a ring trip detection circuit, and a line parameter measurement circuit. As shown therein the invention includes a 'soft' polarity reversal coupling circuit 10, a ring trip detection coupling circuit 20 and a line parameter measurement coupling circuit 30, each of which is connected in circuit with a controlled switching circuit 40. The controlled switching circuit 40 is terminated by a terminal 50 that is adapted to be connected to an externally programmed capacitor 60.

The polarity reversal coupling circuit 10 includes a first, differentially connected controlled device pair, shown as a pair of bipolar transistors 11 and 12, having their emitters coupled in common to a first (polarity reversal (PR)) current source 13, and their collectors coupled to respective ports 14 and 15 of a polarity reversal detection circuit 100. Although the circuit implementation shown and described herein employs bipolar transistors, it is to be understood that the invention is not limited thereto, but also may be configured of alternative equivalent circuit devices, such as field effect transistors (FETs), for example.

The base of transistor 11 is coupled to a first (polarity reversal) voltage reference $Vref_{pr}$, while the base of transistor 12 is coupled to a polarity reversal current source 19 and to a first port 41 of the controlled switching circuit 40. With the dedicated current supply connection shown, the differential transistor pair 11/12 is continuously enabled and drives the polarity reversing circuit 100 for any of the three functional states, so as to ensure that both tip and ring terminals of the SLIC will be fed with the required polarity. Polarity reversal is defined by the polarity reversal current source 19 and the external capacitor 60.

It should be noted that the polarity reversal detection circuit 100, as well as a ring trip detection logic circuit 200, and a loop voltage output logic circuit 300 may be of a type employed in present day SLIC circuits. As such circuits, per se, are of conventional design and details of the same are not required for an understanding of the present invention, they are not shown in detail in FIG. 1 and will not be described here. Instead, in order to maintain a concise description of the invention, the functions of such circuits will be referenced, as appropriate, in the description of the various modes of operation of the invention set forth below.

Figure 2:
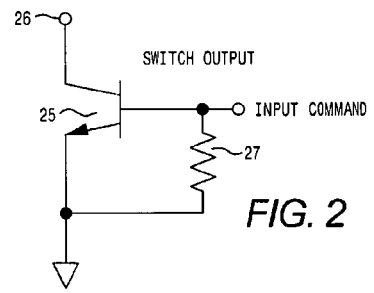
FIG. 2 shows a non-limiting implementation of a unidirectional switch that may be employed in each of the ring trip detection and line parameter measurement coupling circuits of the multi-function circuit of FIG. 1.

The ring trip detection coupling circuit 20 includes a second, differentially connected pair of transistors 21 and 22, having their emitters coupled in common to a second (ring trip (RT)) current source 28, and via a controlled unidirectional switch 24 to a voltage reference terminal (e.g., ground). As a non-limiting implementation, the switch 24, as well as a unidirectional switch 34 within the line parameter measurement coupling circuit 30 to be described, may be configured as a bipolar transistor switch shown in FIG. 2.

As shown therein, the unidirectional switch comprises a bipolar transistor 25 having its collector-emitter path coupled in circuit between a switch output terminal 26 and a voltage reference terminal (e.g., ground), and its base, which is coupled to the voltage reference terminal via a bias resistor 27, is coupled to receive a switch (open/close) command signal. When turned on by an input command applied to its base, transistor 25 serves to sink current applied to its collector (output) terminal 26, and thereby provides a by-pass current flow path therethrough.

In FIG. 1, the collectors of the differentially coupled transistors 21 and 22 of ring trip detection coupling circuit 20 are coupled to respective ports 23 and 24 of a ring trip detection logic circuit 200. The base of the transistor 21 is coupled to receive a second (RT) voltage reference Vref$_{rt}$, while the base of transistor 22 is coupled to a second port 42 of the controlled switching circuit 40, to which a selectively enabled/disabled polarity reversal current source 29 is coupled.

The line parameter measurement coupling circuit 30 includes a third, differentially connected pair of transistors 31 and 32, whose emitters are coupled in common to a third (loop voltage (LV)) current source 33, and via a controlled switch 34 to a voltage reference terminal (e.g., ground). The collectors of transistors 31 and 32 are coupled to respective ports 34 and 35 of a loop voltage output logic circuit 300. The base of transistor 31 is coupled to receive a third (LV) voltage reference VLL, while the base of transistor 32 is coupled to a third port 43 of the switching circuit 40. Port 43 is coupled to a selectively enabled/disabled loop_voltage current source 36 and to the terminal 50, to which capacitor 60 is coupled, as described above. When enabled, the line parameter measurement coupling circuit 30 measures pulse-width timing (which is representative of loop length) in accordance with the value of the loop_voltage current source 36, the value of reference voltage VLL and to the value of the capacitor 60.

Figure 3:
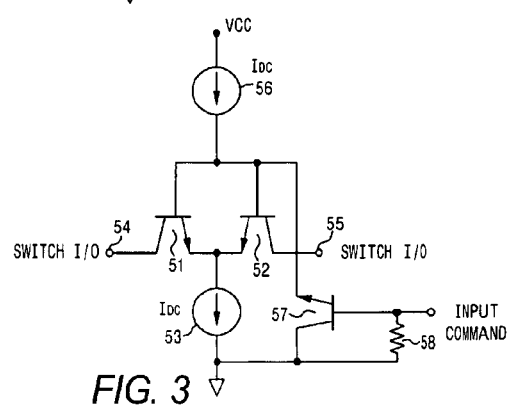
FIG. 3 shows a non-limiting implementation of a bidirectional switch that may be employed in the controlled switching circuit of the multi-function circuit of FIG. 1.

The controlled switching circuit 40 contains a first controlled bidirectional switch 44 coupled between ports 41 and 42, and a second bidirectional controlled switch 45 coupled between ports 42 and 43. As a non-limiting example, each of switches 44 and 45 may be implemented as shown in FIG. 3, to include a pair of bipolar transistors 51 and 52, having their emitters coupled in common to a DC current source 53, and their collectors coupled to respective input/output terminals 54/55 (corresponding to terminal pairs 41/42 and 42/43). The base of each transistor 51/52 is coupled to receive a reference bias DC current supplied by a current source 56, and to the collector-emitter current flow path of a bipolar transistor 57. Transistor 57 has its collector-emitter path coupled to a voltage reference terminal (e.g., ground), and its base, which is coupled to the voltage reference terminal via a bias resistor 58, is coupled to receive a switch (open/close) command signal. When turned-on by an input command applied to the base of transistor 57, the switch provides a bidirectional connectivity between input/output terminals 54/55 through the collector-emitter paths of turned-on transistors 51 and 52.

OPERATION

Polarity Reversal Detection

Whenever the polarity reversal function is to be employed, each of the bidirectional switches 44 and 45 of the controlled switching circuit 40 is closed, so as to provide a closed circuit path between switching circuit ports 41 and 43 and thereby place the capacitor 60 in circuit with the base of transistor 12 of the differentially coupled pair of transistors 11 and 12 of the polarity reversal coupling circuit 10. In addition, the controlled unidirectional switches 24 and 34 within the ring trip detection coupling circuit 20 and the line parameter measurement coupling circuit 30 are closed, so as to provide bias current by-pass paths for the differentially coupled transistors pairs and thereby disable each of coupling circuits 20 and 30. As noted above, the differential transistor pair 21/22 is continuously enabled and drives the polarity reversing circuit 100 to ensure that both tip and ring terminals of the SLIC are fed with the required polarity, with switching circuit 40 providing a connection path therethrough to capacitor 60. As a result, the application of a (soft) polarity reversal command will have its direction established by the polarity of the polarity reversal current source 19 supplied to port 41, and be sensed by the polarity reversal circuit 100, as intended.

Ring Trip Detection

During ringing mode, bidirectional switch 44 of the controlled switching circuit 40 is opened, while its switch 45 is closed, so as to provide a closed circuit path between switching circuit port 42 and 43, and thereby place the capacitor 60 in circuit with the base of transistor 22 of the differentially coupled pair of transistors 21 and 22 of the ring trip detection coupling circuit 20. In addition, the controlled unidirectional switch 24 within the ring trip detection coupling circuit 20 is opened, while the controlled switch 34 in the line parameter measurement coupling circuit 30 is closed.

Since the controlled switch 34 in the line parameter measurement coupling circuit 30 is closed, a bias current by-pass path is provided for the differentially coupled transistor pair 31/32 in line parameter measurement coupling circuit 30, so that the line parameter measurement coupling circuit 30 is disabled. Although the differential transistor pair 21/22 continues to drive the polarity reversing circuit 100 so as to ensure that both tip and ring terminals of the SLIC are fed with the required polarity, as described above, the path through switch 44 of the switching circuit 40 is interrupted. Consequently, the capacitor 60 is now connected exclusively to the ring trip detection coupling circuit 20, to serve as a ring trip filter function.

Loop Voltage Test Mode

During loop voltage test mode, each of the switches 44 and 45 of the controlled switching circuit 40 is opened, so as to prevent a closed circuit path between either of circuits 10 and 20 and the capacitor 60. In addition, the controlled unidirectional switch 24 within the ring trip detection coupling circuit 20 is closed, while the controlled switch 34 in the line parameter measurement coupling circuit 30 is opened. Since the controlled switch 24 in the ring trip coupling circuit 20 is closed, a bias current by-pass path is provided for the differentially coupled transistor pair 21/22 in the ring trip detection coupling circuit 20, so that the ring trip detection coupling circuit 20 is disabled. Also, although the differential transistor pair 21/22 continues to drive the polarity reversing circuit 100 so that the tip and ring terminals of the SLIC are fed with the required polarity, the path through switch 44 of the switching circuit 40 is interrupted. Consequently, the capacitor 60 is now connected exclusively to the line measurement coupling circuit 30. This allows pulse-width timing required for a given loop length to be established by the value of the loop_voltage current source 36, the value of reference voltage VLL, and the value of the capacitor 60.

As will be appreciated from the foregoing description, the hardware complexity problem associated with the use of separate dedicated capacitors for implementing multiple functions of a line card circuit, including soft polarity reversal of the tip and ring terminals, preventing false detection (ring trip) when ringing the phone, and providing a measure of the length of the wireline pair that connects the line card to the phone, are significantly reduced in accordance with the controllably switched circuit architecture of the present invention. As described above, the invention takes advantage of the fact that these three functions are not required nor do not they have to occur at the same time. As a result, each function can be implemented with the same capacitor element, which is controllably switched in circuit with an associated signaling circuit for that function.

While I have shown and described an embodiment in accordance with the present invention, it is to be understood that the same is not limited thereto but is susceptible to numerous changes and modifications as known to a person skilled in the art, and I therefore do it not wish to be limited to the details shown and described herein, but intend to cover all such changes and modifications as are obvious to one of ordinary skill in the art.

What is claimed is:

1. A method of selectively enabling each of a plurality of respectively different circuits of a multi-function circuit arrangement to perform its respective signaling function, each respectively different circuit requiring use of the same external passive analog circuit component to implement its respective signaling function, said method comprising the steps of:
   (a) providing a single external passive analog circuit component that corresponds to said same external passive analog circuit component, and
   (b) in association with performance of each respectively different circuit function of said multi-function circuit arrangement,
      (b1) enabling that one of said plurality of respectively different circuits which performs said each circuit function, while selectively disabling one or more others of said plurality of respectively different circuits which do not perform said each circuit function, and
      (b2) coupling said single external passive analog circuit component to said one of said plurality of respectively different circuits, while decoupling said single external passive analog circuit component from said one or more others of said plurality of respectively different circuits wherein said multi-function circuit arrangement comprises a telecommunication circuit card and said plurality of respectively different circuits include two or more of a polarity reversal detection circuit, a ring-trip circuit, and a line voltage measurement circuit, and wherein said same external passive analog circuit component comprises a capacitor.

2. A method according to claim 1, wherein, during operation of each of said ring-trip circuit and said line voltage measurement circuit,
   step (b1) comprises enabling said polarity reversal detection circuit, so that tip and ring terminals of said telecommunication circuit will be supplied with a required polarity voltage, and
   step (b2) comprises decoupling said capacitor from said polarity reversal detection circuit.

3. A method according to claim 1, wherein step (b1) includes continuously enabling said polarity reversal detection circuit irrespective of whether said polarity reversal detection circuit is to be coupled with said capacitor in step (b2), but selectively enabling only that one of said ring-trip circuit and said line voltage measurement circuit that is to be coupled with said capacitor in step (b2).

4. A method of selectively enabling each of a plurality of respectively different circuits of a multi-function circuit arrangement to perform its respective signaling function, each respectively different circuit requiring use of the same external passive analog circuit component to implement its respective signaling function, said method comprising the steps of:
   a providing a single external passive analog circuit component that corresponds to said same external passive analog circuit component, and
   (b) in association with performance of each respectively different circuit function of said multi-function circuit arrangement,
      (b1) enabling that one of said plurality of respectively different circuits which performs said each circuit function, while selectively disabling one or more others of said plurality of respectively different circuits which do not perform said each circuit function, and
      (b2) coupling said single external passive analog circuit component to said one of said plurality of respectively different circuits, while decoupling said single external passive analog circuit component from said one or more others of said plurality of respectively different circuits, wherein
   step (b2) comprises coupling said single external passive analog circuit component to said one of said plurality of respectively different circuits through a selectively controlled switching circuit having a plurality ports respectively coupled to said plurality of respectively different circuits, and a component-coupling port coupled to said single external passive analog circuit component wherein said multi-function circuit arrangement comprises a telecommunication circuit card and said plurality of respectively different circuits include two or more of a polarity reversal detection circuit, a ring-trip circuit, and a line voltage measurement circuit, said same type of external passive analog circuit component comprises a capacitor, and wherein said polarity reversal detection circuit is coupled to a first one of said plurality of ports of said controlled switching circuit, and said ring-trip circuit and said line voltage measurement circuit are coupled to respective and second and third ones of said plurality of ports of said controlled switching circuit, that are intermediate said first one of said plurality of ports and said component-coupling port.

5. An apparatus for selectively enabling each of a plurality of respectively different circuits of a multi-function circuit device to perform its respective signaling function, each respectively different circuit requiring use of the same external passive analog circuit component to implement its respective signaling function, comprising:
   a single connection terminal adapted to coupled to a single external circuit component that corresponds to said game external passive analog circuit component; and
   a circuit interconnection arrangement which is operative, in association with performance of each respectively different circuit function of said multi-function circuit device, to enable that one of said plurality of respectively different circuits which performs said each circuit function, and to selectively disable one or more others of said plurality of respectively different circuits which do not perform said each circuit function, and to couple said single external passive analog circuit component to said one of said plurality of respectively different circuits, while decoupling said single external passive analog circuit component from said one or more others of said plurality of respectively different circuits wherein said multi-function circuit arrangement comprises a telecommunication circuit card and said plurality of respectively different circuits include two or more of a polarity reversal detection circuit, a ring-trip circuit, and a line voltage measurement circuit, and wherein said same external passive analog circuit component comprises a capacitor.

6. An apparatus according to claim 5, wherein, during activation of each of said ring-trip circuit and said line voltage measurement circuit, said circuit interconnection arrangement is operative to enable said polarity reversal detection circuit, so that tip and ring terminals of said telecommunication circuit will be supplied with a required polarity voltage, and to decouple said capacitor from said polarity reversal detection circuit.

7. An apparatus for selectively enabling each of a plurality of respectively different circuits of a multi-function circuit device to perform its respective signaling function, each respectively different circuit requiring use of the same external passive analog circuit component to implement its respective signaling-function, comprising:

a single connection terminal adapted to coupled to a single external circuit component that corresponds to said same external passive analog circuit component, and a circuit interconnection arrangement which is operative, in association with performance of each respectively different circuit function of said multi-function circuit device, to enable that one of said plurality of respectively different circuits which performs said each circuit function, and to selectively disable one or more others of said plurality of respectively different circuits which do not perform said each circuit function, and to couple said single external passive analog circuit component to said one of said plurality of respectively different circuits, while decoupling said single external passive analog circuit component from said one or more others of said plurality of respectively different circuits, wherein said circuit interconnection arrangement wherein said circuit interconnection arrangement includes a selectively controlled switching circuit having a plurality ports respectively coupled to said plurality of respectively different circuits, and a component-coupling port coupled to said single external passive analog circuit component, and which is operative to couple said single external passive analog circuit component to said one of said plurality of respectively different circuits wherein said multi-function circuit device comprises a telecommunication circuit card and said plurality of respectively different circuits include two or more of a polarity reversal detection circuit, a ring-trip circuit, and a line voltage measurement circuit, said same external passive analog circuit component comprises a capacitor, and wherein said polarity reversal detection circuit is coupled to a first one of said plurality of ports of said controlled switching circuit, and said ring-trip circuit and said line voltage measurement circuit are coupled to respective and second and third ones of said plurality of ports of said controlled switching circuit, that are intermediate said first one of said plurality of ports and said component-coupling port.

8. A method of selectively enabling each of a plurality of respectively different circuits of a multi-function circuit card to perform its respective signaling function, said plurality of respectively different circuits including a polarity reversal detection circuit, a ring-trip circuit, and a line voltage measurement circuit, and wherein each respectively different circuit requires the use of an external capacitor to implement its respective signaling function, said method comprising the steps of:

(a) providing a single connection port that is adapted to be coupled to said external capacitor, and (b) in association with performance of each respectively different circuit function of said multi-function circuit arrangement, (b1) enabling that one of said plurality of respectively different circuits which performs said each circuit function, while selectively disabling one or more others of said plurality of respectively different circuits which do not perform said each circuit function, and (b2) coupling said single external capacitor to said one of said plurality of respectively different circuits, while decoupling said single external capacitor from said one or more others of said plurality of respectively different circuits.

9. A method according to claim 8, wherein step (b2) comprises coupling said single external capacitor to said one of said plurality of respectively different circuits through a selectively controlled switching circuit having a plurality ports respectively coupled to said plurality of respectively different circuits, and a component-coupling port coupled to said single external capacitor.

10. A method according to claim 8, wherein step (b1) comprises controllably enabling that one of said plurality of respectively different circuits which performs said each circuit function by means of a differentially coupled transistor circuit.

11. A method according to claim 8, wherein, during operation of each of said ring-trip circuit and said line voltage measurement circuit, step (b1) comprises enabling said polarity reversal detection circuit, so that tip and ring terminals of said telecommunication circuit will be supplied with a required polarity voltage, and step (b2) comprises decoupling said single external capacitor from said polarity reversal detection circuit.

12. A method according to claim 8, wherein step (b1) includes continuously enabling said polarity reversal detection circuit irrespective of whether said polarity reversal detection circuit is to be coupled with said capacitor in step (b2), but selectively enabling only that one of said ring-trip circuit and said line voltage measurement circuit that is to be coupled with said capacitor in step (b2).

13. A method according to claim 9, wherein said polarity reversal detection circuit is coupled to a first one of said plurality of ports of said controlled switching circuit, and said ring-trip circuit and said line voltage measurement circuit are coupled to respective and second and third ones of said plurality of ports of said controlled switching circuit, that are intermediate said first one of said plurality of ports and said component-coupling port.

* * * * *